(12) United States Patent
Bangle

(10) Patent No.: US 11,104,433 B2
(45) Date of Patent: Aug. 31, 2021

(54) AIRCRAFT FLOAT

(71) Applicant: David Bangle, Sandpoint, ID (US)

(72) Inventor: David Bangle, Sandpoint, ID (US)

(*) Notice: Subject to any disclaimer, the term of this patent is extended or adjusted under 35 U.S.C. 154(b) by 196 days.

(21) Appl. No.: 16/515,260

(22) Filed: Jul. 18, 2019

(65) Prior Publication Data
US 2020/0023950 A1    Jan. 23, 2020

Related U.S. Application Data

(60) Provisional application No. 62/701,287, filed on Jul. 20, 2018.

(51) Int. Cl.
  *B64C 25/54* (2006.01)
  *B64C 35/00* (2006.01)
  *B64C 25/66* (2006.01)

(52) U.S. Cl.
  CPC ............ *B64C 35/008* (2013.01); *B64C 25/54* (2013.01); *B64C 25/66* (2013.01); *B64C 35/00* (2013.01)

(58) Field of Classification Search
  CPC ......... B64C 25/54; B64C 25/56; B64C 25/66; B64C 35/00; B64C 35/008
  See application file for complete search history.

(56) References Cited

U.S. PATENT DOCUMENTS

| | | | | |
|---|---|---|---|---|
| 4,027,835 A | * | 6/1977 | Sachs | B64C 25/52 244/101 |
| 4,848,702 A | * | 7/1989 | Riggins | B64C 25/54 244/105 |
| 5,645,250 A | * | 7/1997 | Gevers | B64D 27/00 244/101 |
| 2002/0113169 A1 | * | 8/2002 | To | B64C 25/54 244/130 |
| 2011/0001000 A1 | * | 1/2011 | Zhu | B64C 39/001 244/12.1 |
| 2011/0248118 A1 | * | 10/2011 | Meekins | B64C 25/66 244/101 |
| 2013/0255559 A1 | * | 10/2013 | Daley | B63B 39/06 114/278 |

* cited by examiner

*Primary Examiner* — Philip J Bonzell
*Assistant Examiner* — Tye William Abell
(74) *Attorney, Agent, or Firm* — Indiano Law Group, LLC; John T. Woods, III (57) ABSTRACT

An aircraft float includes a float body configured to provide buoyancy to an aircraft, and a lower portion of the float body is configured to contact water. The lower portion of the float body includes a turbulator.

16 Claims, 11 Drawing Sheets

AIRCRAFT FLOAT

CROSS REFERENCE TO RELATED APPLICATIONS

The present application claims the benefit of U.S. Provisional Patent Application No. 62/701,287, filed Jul. 20, 2018, the entire contents of which are expressly incorporated herein by reference.

TECHNICAL FIELD OF THE INVENTION

The technical field generally relates to seaplanes, and specifically to aircraft float design.

BACKGROUND

Figure 1:
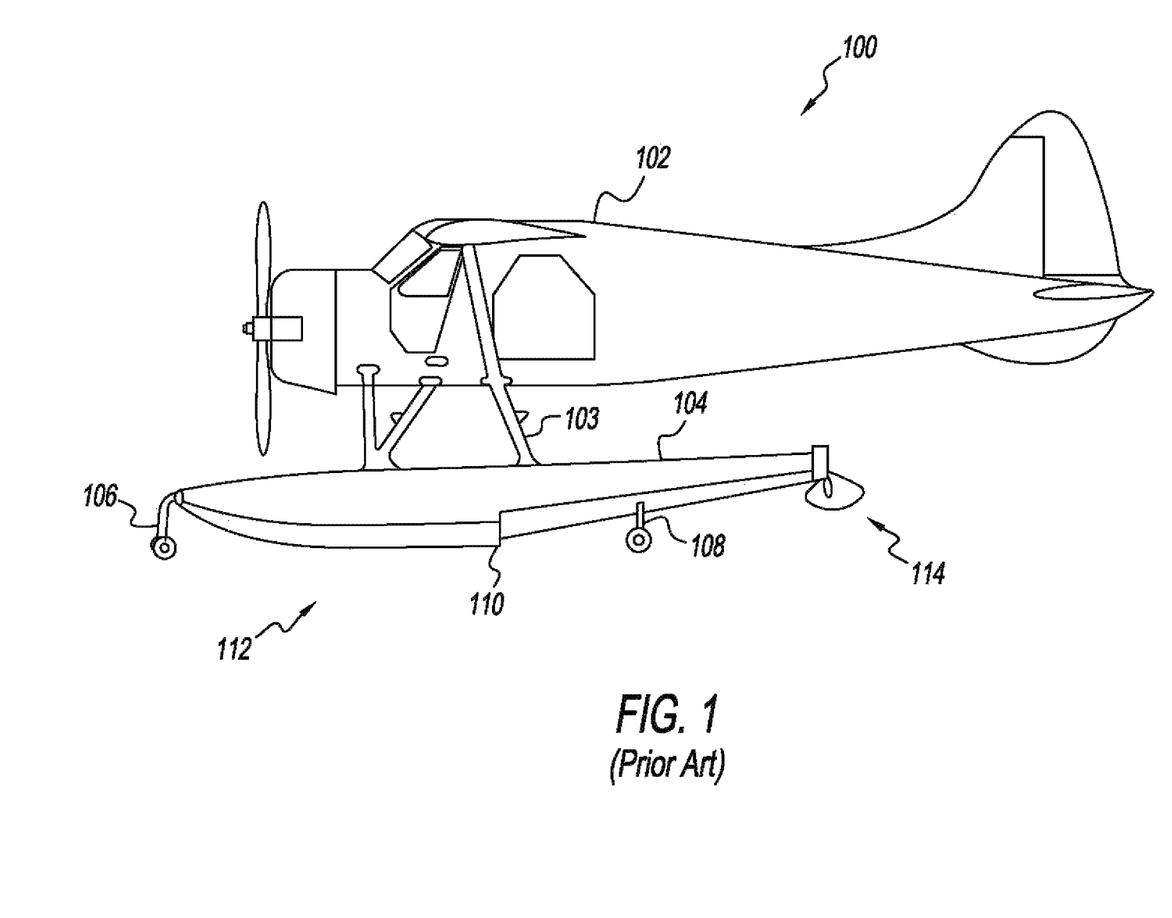
FIG. 1 is a side view of a floatplane according to the teachings of the prior art.

Seaplanes include one or more floats, which in various forms can be mounted under the fuselage (e.g. a floatplane) or can be integrated with the fuselage (e.g. a flying boat). These floats provide buoyancy to the aircraft and permit the aircraft to takeoff and land on water. FIG. 1 depicts a floatplane 100 of the prior art. As is illustrated, the floatplane 100 comprises an aircraft 102 having an undercarriage structure 103, depicted as a plurality of pylons, to which floats 104 are coupled. The floatplane 100 can include a nose landing gear 106 and a rear landing gear 108 to provide the floatplane 100 the ability to takeoff and land from paved runways, thereby making the floatplane 100 an amphibious vehicle. The float 104 is illustrative of a typical pontoon type float 112 of the prior art. The float 104 is depicted as including a retractable rudder 114 and a step 110, as are presently employed. Most pontoon type floats are provided in pairs which are spatially separated to provide stability for the aircraft when floating.

The ability to utilize a body of water as a runway makes seaplanes uniquely suited to access a variety of undeveloped areas which are located near bodies of water For example, seaplanes are utilized to deliver supplies and provide transportation to various remote communities in Alaska which often do not have airports or developed roads. However, there are various drawbacks with current floatplane technologies.

Present aircraft floats can resist becoming disengaged from the water during aircraft takeoff, especially if the water is calm and "glassy". This resistance is due to a suction-type effect of the water on the aircraft float which is caused by the surface tension of the water acting on the float. To overcome this suction effect, a typical floatplane takeoff includes a rocking motion in which a first float is raised out of and disengaged from the water first and is maintained a few inches off the water, thereby reducing drag and increasing aircraft speed. The opposing second side float is then lifted out of the water allowing the aircraft to continue in flight. As a flying boat only has a single float, typically integrated into a lower portion of the aircraft fuselage, the aforementioned rocking motion cannot be utilized. This can result in significant difficulty during takeoff in calm water conditions, where it can feel to a pilot as though the aircraft is "stuck" to the water. Examples of flying boats include the icon A-5, the Bowing 314 Clipper, the PBY Catalina, and the Canadair CL-415.

Relative their land based counterparts, seaplanes typically require an increased takeoff distance, can suffer from a reduced maximum takeoff weight, and can require significantly greater pilot skill to takeoff safely from calm water.

Most present aircraft floats are constructed of either aluminum or fiberglass. These floats include a plurality of bulkheads which extend across a width of the float in a plane perpendicular to the longitudinal axis of the float. The bulkheads define a plurality of individual compartments within the float. The bulkheads contribute to hull stiffness and help maintain the shape of the float. Surrounding the bulkheads is a thick skin. This thick skin serves as a load bearing component and maintains hull stiffness. In composite floats, the float skin can exceed 1 inch in thickness to prevent stress fractures. As would be appreciated, the thickness of the float skin contributes significantly to the weight of the float, and decreases the cargo capacity which can be carried by the aircraft.

Seaplanes can be equipped with landing gears to permit the aircraft to land at traditional airports. These wheeled landing gears can be integrated into the floats. However, the integration of these landing gears into the floats increases the weight of the aircraft which decreases the cargo capacity and fuel economy. The loads from the landing gears are transferred to the float skin through a bulkhead, typically requiring a thick and heavy float skin to support such loads. Due to these penalties, many floatplanes are not equipped with such landing gears, and therefore forego the ability to land on improvised runways and at traditional airports.

Current float designs suffer various additional disadvantages. For example, hard landings, water impacts and/or crashes result in impact energy being passed through the float and into the airframe and the passengers. The thick, stiff float skin commonly utilized in composite designs fails to absorb the impact energy, which results in the impact energy being passed from the float to the aircraft. Alternatively, floats which have less stiffness are prone to bending, crumpling, or crushing. Therefore, further technological developments are desirable in this area.

SUMMARY

One embodiment of the present application is directed to a unique aircraft float apparatus which includes a plurality of turbulators located at a water contacting surface. Other embodiments of the present application include unique aircraft float apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 2:
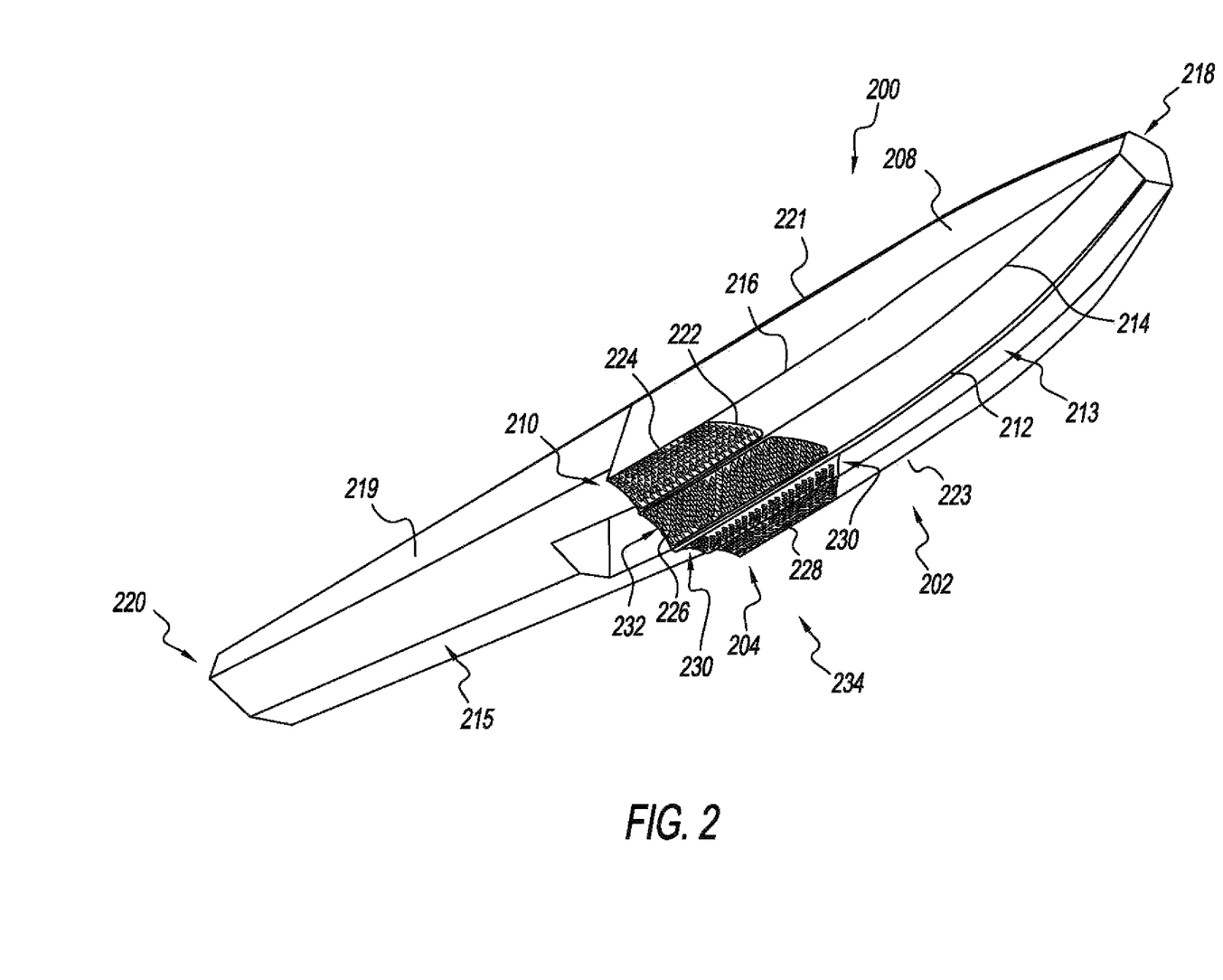
FIG. 2 is a perspective view of an aircraft float including a plurality of turbulators according to one form of the present application.

FIG. 2 depicts one form of an aircraft float 200 according to the principles of the present application. The aircraft float 200 includes an aircraft float body 208 which extends from a forward (bow) portion 218 to a rearward (stern) portion 220.

The float 200 also includes an upper surface 219, a right (starboard) side surface 221 and a left (port) side surface 223. The aircraft float 200 is configured for attachment to an aircraft (not shown) that is disposed above the upper surface 219. The aircraft float 200 enables the aircraft to takeoff and land on water. The aircraft float 200 additionally provides buoyancy to the aircraft and permits the aircraft to float on the water, even when the aircraft is in an idle or off condition (e.g. when the aircraft is "docked").

A lower portion 202 of the float 200 comprises the water contacting surface of the float 200. As the lower surface 202 of the float 200 serves as the water engaging member of the float 200, the float 200 can have a shape that incorporates principles and shapes common to the hulls of other water engaging vessel surfaces. As is shown, the float can include a shallow V-shaped hull configuration. The lower portion 202 can include a keel 212, sister keelson 214, and chine 216 located forward of a step 210.

This lower portion 202 includes water engaging turbulators 204 configured to promote turbulence in the water as the float 200 passes therethrough. The turbulators 204 can create turbulent flow in a boundary layer between the water engaging surface of the lower portion 202 of the float 200 and the water. As is illustrated, a plurality of turbulators 204 are located on the lower portion 202 of the aircraft float body 208 where the float 200 makes contact with the water during takeoff. As used in this application, the term "turbulator" refers to any feature designed to induce turbulence in the water flowing across it.

In a preferred form, a plurality of turbulators 204 are integrated in an array of turbulators. It has been discovered that these turbulators create turbulence in the water at the boundary layer between the water and the float surface, thereby significantly reducing the suction between the aircraft float 200 and the water caused by the surface tension of the water.

Although the turbulators 204 are depicted as covering a contact patch 234, where the water meets the float 200 when the float 200 is on plane, it is contemplated that one or more turbulators 204 can be placed in various locations along the water-engaging lower portion 202. As illustrated, the turbulator 204 can comprises an array of individual turbulators 204 that form turbulator array 232. The turbulator array 232 can extend across the entire water contacting surface of the lower portion 202 of the float, or alternately only on a portion thereof. In one specific form, the turbulator array 232 can include a first turbulator panel 226 located between the keel 212 and sister keelson 214 and a second turbulator panel 224 located between the sister keelson 214 and chine 216. Turbulator panels 228, 230 are depicted on the opposing side, the left side 223, of the float body 208 between the sister keelson 214 and the chine 216 and the keel 212 and the sister keelson 214. These turbulator panels 224, 226, 228, and 230 are depicted as being located forward of the step 210. In one form, the turbulator panels 224, 226, 228, and 230 can include a taper 222 between the keel 212 and the chine 216.

The lower portion 202 of the float 200 includes a forwardly disposed planing portion 213 and a rearwardly disposed portion 215 which are separated by step 210. As is shown, the height of the planing portion 213 is generally greater than the height of the rearward portion 215.

The turbulator array 232, which is depicted as comprising an array of scale-like turbulators 204, can be located on the planning portion 213 such that the turbulator array 232 terminates at the step 210. The turbulator array 232 can then extend forward from the step approximately toward the bow 218. As depicted, the turbulator array 232 extends approximately ¼ of the way between the step 210 and the bow 218. The turbulator array 232 is positioned on the planing surface 213 to engage the water under the float 200. It can be advantageous to locate the turbulators 204 at a position on the lower portion 202 of the float where the planing surface 213 is in contact with the water during takeoff as this can provide the greatest reduction in suction effect between the water and the lower portion 202 during takeoff.

Turbulators 204 can be placed in a variety of locations, and can take a variety of configurations, on the lower portion 202 of the float 200. It is contemplated that a turbulator array 232 can cover the entire lower portion 202 of the float 200. The turbulator array 232 can extend substantially across a width of the float 200. However, it is contemplated that any number or configuration of turbulators 204 can be located on the lower portion 202 to reduce the effects of suction, to a desired level, during takeoff. In further forms, it is contemplated that a single row of turbulators 204 can be placed toward the rearward portion of the hydroplaning surface 213 adjacent to step 210.

The aircraft float 200 is depicted as a pontoon 200, as can be utilized with a floatplane. However, as will be discussed hereinafter, the turbulators can be integrated into the float hull of a flying boat. Although a flying boat typically uses its float hull as the primary water contacting surface of the aircraft, many flying boats include one or more floats disposed outwardly from the hull to provide stability. In such aircraft, it is contemplated that turbulators can be included on both the float hull and outwardly disposed floats.

As would be understood, the size and design of the aircraft float 200 are dependent upon the size, shape, weight, and design of the specific aircraft to which the aircraft float 200 will be attached, as well as the preferences of the designer of the float 200 and aircraft.

The integration of the turbulators 204 to the lower portion 202 of the float 200 lends itself to ease of aircraft takeoff. As the aircraft accelerates, the turbulators 204 are pushed through the water. The turbulators 204 act on the water and create turbulence in the water. This turbulence reduces the suction effect of the surface tension of the water acting on the float 200. The turbulators 204 can create turbulent flow in a boundary layer between the aircraft float 200 and the water. As the float 200 is not "sucked" to the water, once the aircraft has reached an appropriate speed, the aircraft can easily lift off the water.

It has been discovered that the reduction of this suction effect can permit the aircraft to takeoff from the water without rocking the floats, as was previously discussed. By disengaging the pair of floats simultaneously, the pilot is more likely to be able to achieve a more level, safer take-off. It is believed that integration of turbulators into the float/hull of a flying boat can provide the aircraft with the ability to takeoff from glassy water. Advantageously, it is believed that this reduction can additionally lead to an increase in useful payload.

Figure 3:
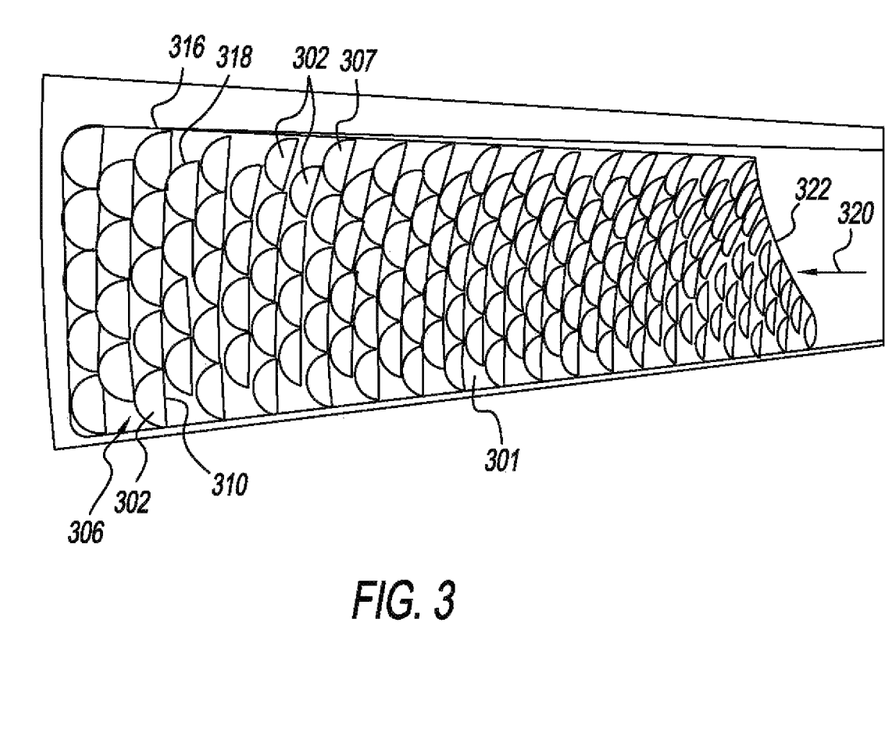
FIG. 3 depicts a plurality of turbulators having a scale-like semi-circular form.
Figure 3A:
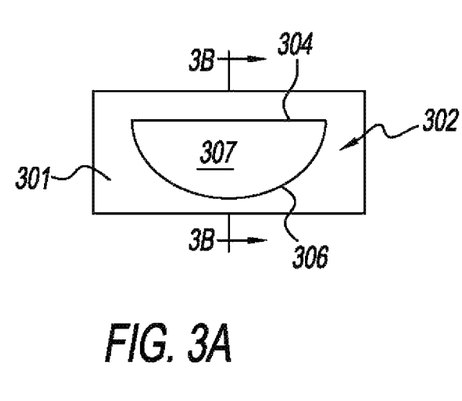
FIG. 3A is a bottom view of a single turbulator.
Figure 3B:
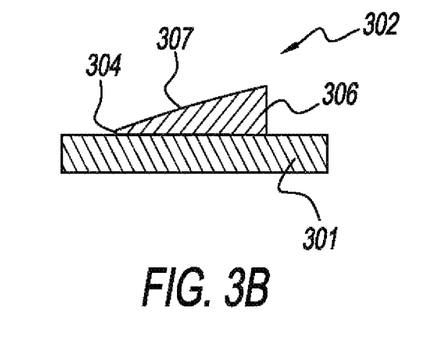
FIG. 3B is a sectional view of a single turbulator taken along lines 3-3B of FIG. 3A.

FIG. 3 depicts one turbulator 204 design of the present application. The direction of water flow is illustrated by arrow 320 to depict that the water flows from the bow 218 toward the stern 220. In the form depicted with regard to FIG. 3, each turbulator 204 is shaped as a semi-circular ramped disc turbulator 302. As best shown in FIGS. 3A and B, each semi-circular ramped disc turbulator 302 is formed on includes a base 301. The turbulators 302 include a generally linear leading edge 304 and a semi-circular trailing edge 306. The turbulators 302 have a ramped outwardly facing surface 307 such that the turbulator 302 has a relatively thinner leading edge portion adjacent the leading edge 304, and a relatively thicker trailing edge portion adjacent the trailing edge 306. In this form, each turbulator 302 angles outwardly from the float 200 between a leading end 304 and a trailing end 306. In this form, the turbulators 302 can be tightly arrayed into offset rows 316, 318 forming a scale-like pattern.

Figure 4:
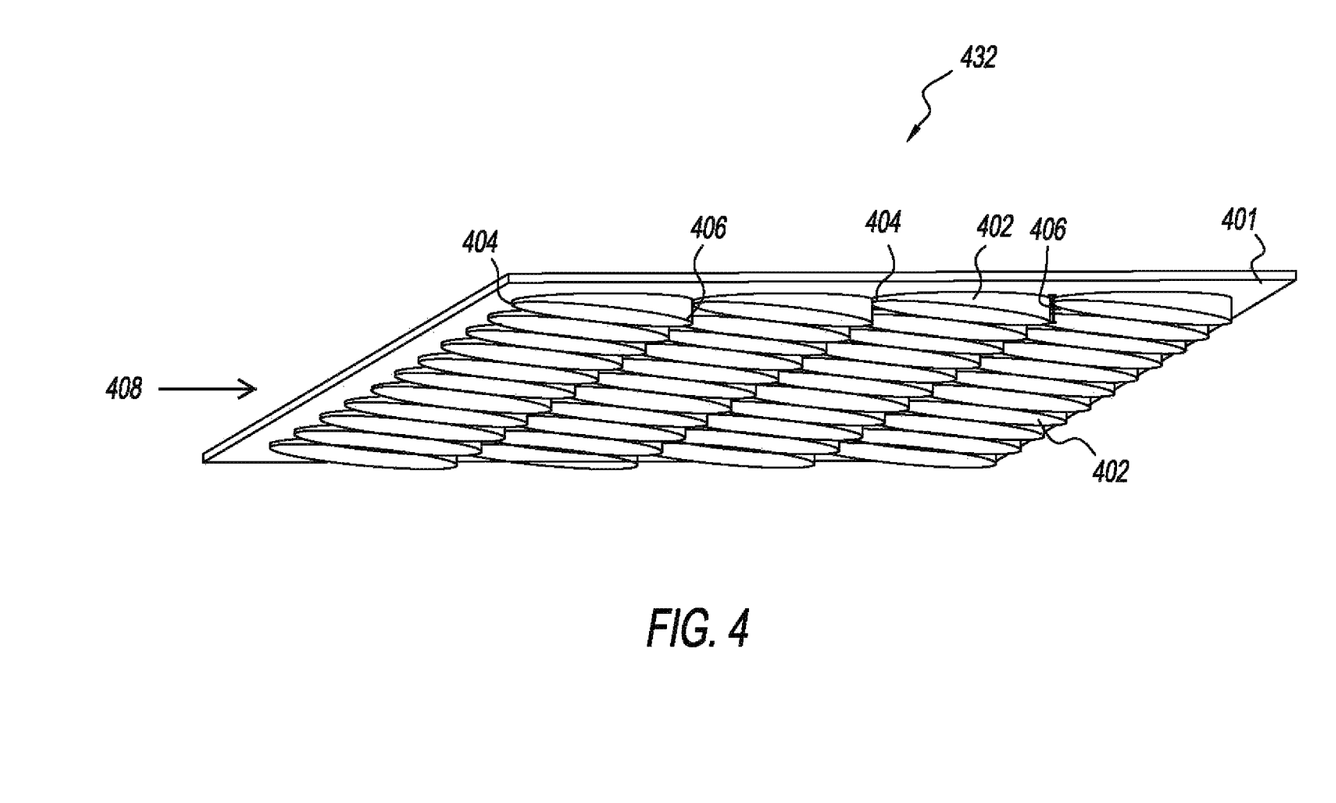
FIG. 4 depicts a plurality of turbulators having an oblong form.
Figure 4A:
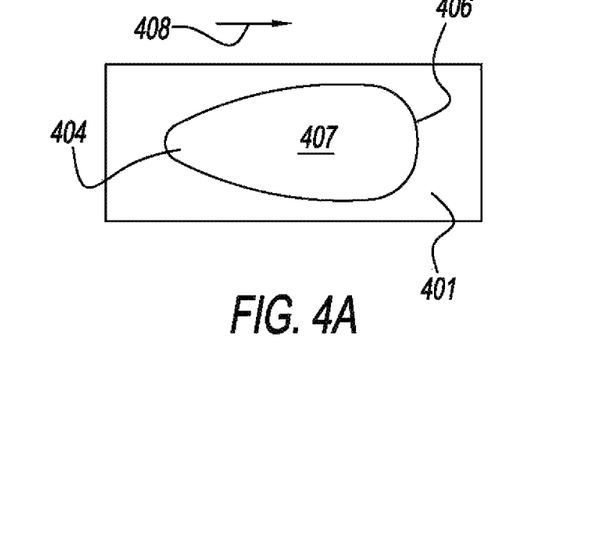
FIG. 4A is a bottom view of a single alternate embodiment turbulator.
Figure 4B:
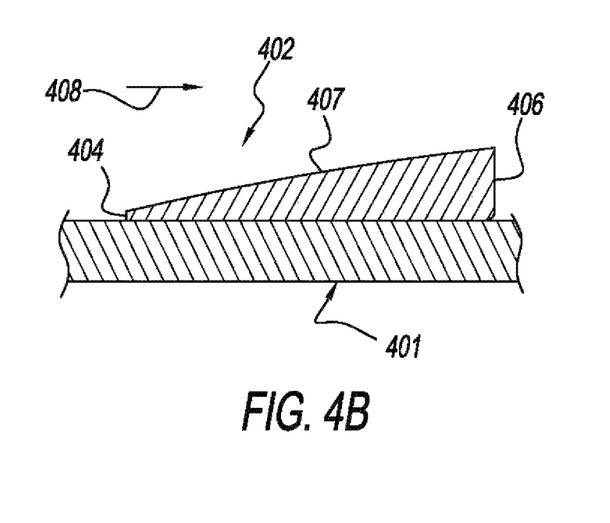
FIG. 4B is a sectional view of a single alternate embodiment turbulator taken along lines 4B-4B of FIG. 4A.

The embodiment shown in FIGS. 4, 4A, and 4B depicts an alternative turbulator 204 design which include oblong type turbulators 402. A turbulator array 432 that includes a base member 401 on which a plurality of turbulators 402 are formed is depicted. The turbulators 402 are generally oblong in shape and ramp outwardly from a leading edge 404 to a trailing edge 406. Each of the turbulators 402 includes a leading edge 404 and a trailing edge 406. A generally planer water-engaging surface 407 is provided that is generally ovaloid and elongated in configuration. The direction of water flow is depicted generally at 408, from the leading edge 404 toward the trailing edge 406.

In the specific turbulator array 432 depicted in FIG. 4, the turbulator array 432 comprises an array of individual turbulators 402. As was discussed with regard to FIG. 3, the turbulator 402 rows can be offset and form a scale-like pattern. The turbulators 402 can be designed to extend across substantially the entire contact patch 234 of a float-plane float 200, or the float 200 hull of a flying boat.

Alternately, the turbulators 402 can be located in arrays (e.g. 432) or even in a single row, as was previously discussed. For example, it is likely that the turbulator array 432 shown in FIG. 4 would be placed alongside a similar-sized turbulator array, so that each turbulator array 432 would cover one portion of the "V" shaped water engaging surface 232 of the float of the plane.

Although the semi-circular ramped disc shaped turbulators 302 and the ovaloid turbulators 402 are shown in FIGS. 3 and 4, other turbulator 204 shapes can be employed. For example, the turbulators 204 can be formed as semi-spherical turbulators, dimpled turbulators, teardrop (or airfoil) turbulators, and ridged turbulators, chevron shaped turbulators. However, it is contemplated that the turbulators 204 can take any form sufficient to act on the water to create turbulence in the water to reduce a suction effect on the float during aircraft takeoff. These turbulators 204 create turbulence at the boundary layer between the aircraft float 200 and the water, to thereby reduce the attraction between the surface of the water and the surface of the aircraft float 200.

It has been discovered that the integration of these turbulators 204 into the aircraft float 200 has minimal effects on the flying characteristics of the float 200, as the integration of the turbulators 204 do not significantly increase float drag during flight.

In various forms, the turbulators 204 can be integrally molded with the aircraft float 200 or can be adhered thereto. It is contemplated that the float 200 can be produced from a variety of composite materials which include, but are not limited to, carbon fiber, Kevlar, fiberglass, and/or any other composite material suitable for flight (e.g. has sufficient strength but is relatively light in weight). In other forms, it is contemplated that the float 200 is manufactured of aluminum. In the case of an aluminum float 200, the turbulators 204 can be stamped or pressed into the aluminum.

In another form, turbulators 204 can be adhered to the exterior surface of the float 200 through a variety of chemical or mechanical bonding techniques (e.g. epoxies, welds, adhesives, or the like.), which can permit reduced cost for retrofit applications. In one specific form, a plurality of turbulators 204 can be integrated into a strip, such as array 432, which can then be adhered to a desired location on the lower portion 202 of the aircraft float 200. In one specific form, the strip can include an adhesive backing for ease of installation. As would be understood to a person of ordinary skill in the art, the turbulators 204 can be integrated into the lower portion 202 through a variety of construction techniques which would depend, at least in part, on the material the float 200 is constructed from.

The integration of the turbulators 204 to the lower portion 202 of the float 200 lends itself to ease of aircraft takeoff. As the aircraft accelerates, the turbulators 204 are pushed through the water. The turbulators 204 act on the water and create turbulence in the water at the boundary layer between the aircraft float 200 and the water. This turbulence reduces the surface tension of the water acting on the float 200. Once the aircraft has reached an appropriate speed, the aircraft can lift off the water without having to rock as the float(s) 200 are not sucked to the water. In this manner a level takeoff can be achieved. Although the description and designs above have been directed presently to the use of the present invention on the floats of a float plane, it will be appreciated that the turbulators will also perform well when incorporated into, or placed on, the water-engaging hull 440 surface of a seaplane such as the Consolidated PBY Catalina 442 shown in FIG. 6.

Figure 5:
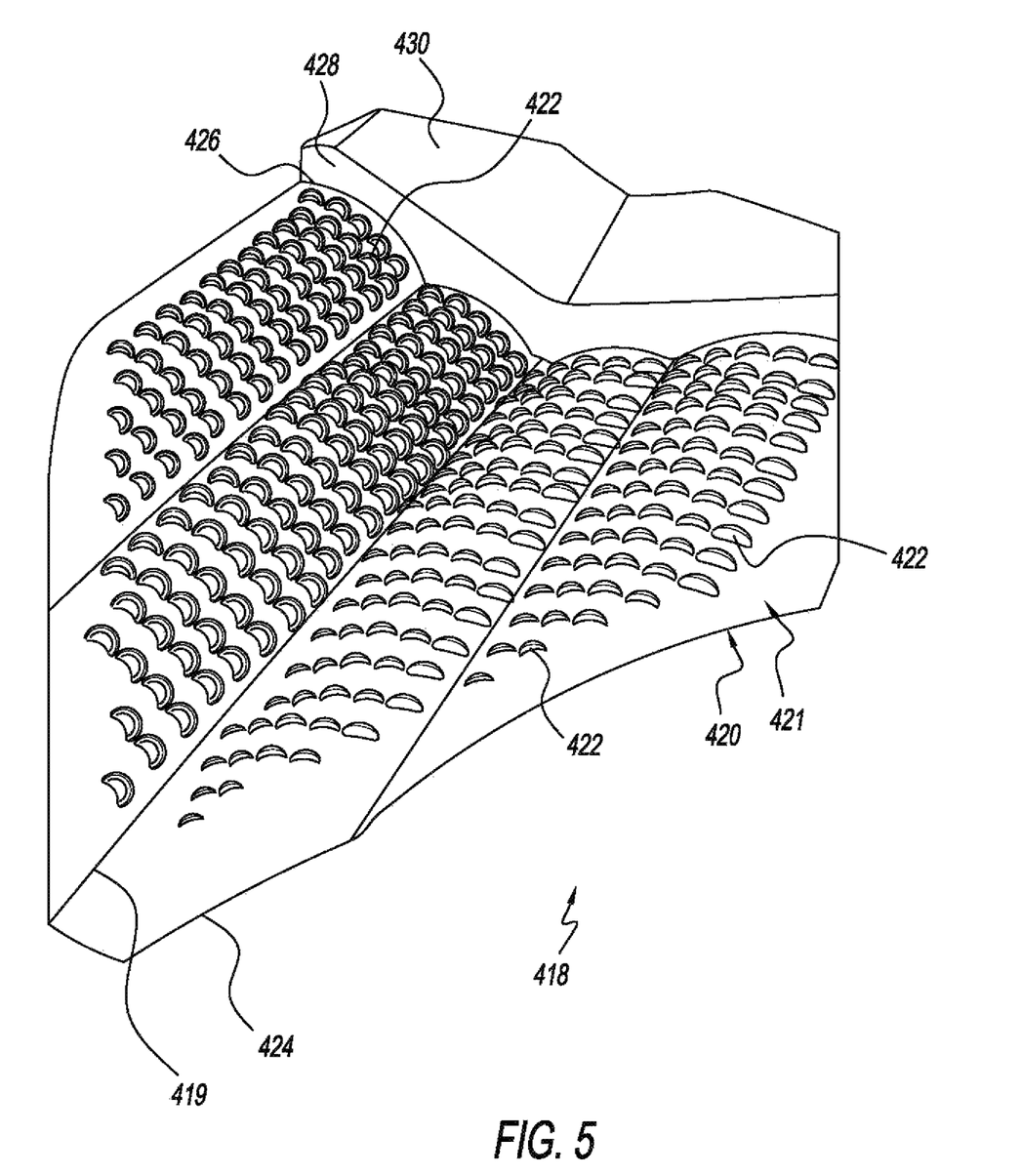
FIG. 5 is a perspective view of a mold for integrally forming a plurality of turbulators with an aircraft float according to one form of the present application.

Referring now to FIG. 5, one form of a mold 418 for constructing a turbulator array 420 is depicted. As illustrated, a plurality of individual turbulator recesses 422 are located in the mold 418. It will be noted that the mold 418 includes a generally v-shaped configuration, with a central line 419 that is placeable at the apex (or apogee) of the "V" of float 200. The mold 418 shows a reverse of the actual turbulator array 420 that will be formed. As such, the apogee of the mold at 419, will represent the apex, such as keel 212, of the "V" shaped hull. Similarly, a step 426 can be seen in the mold 418 at the trailing edge 426 of the turbulator array 420. As the turbulator array 420 is reversed when released from the mold 418, the trailing or rearward portion 430 of the float actually has a reduced thickness when compared to the planing portion 421 of the float.

The turbulator array mold includes the leading edge 424 and the trailing edge 428 that terminates at the step 426. The step 426 comprises the surface that is generally disposed in a plane perpendicular to the primary plane of the float, and defines the boundary between the planing portion 421 of the finished float, and the rear portion 430.

Figure 6:
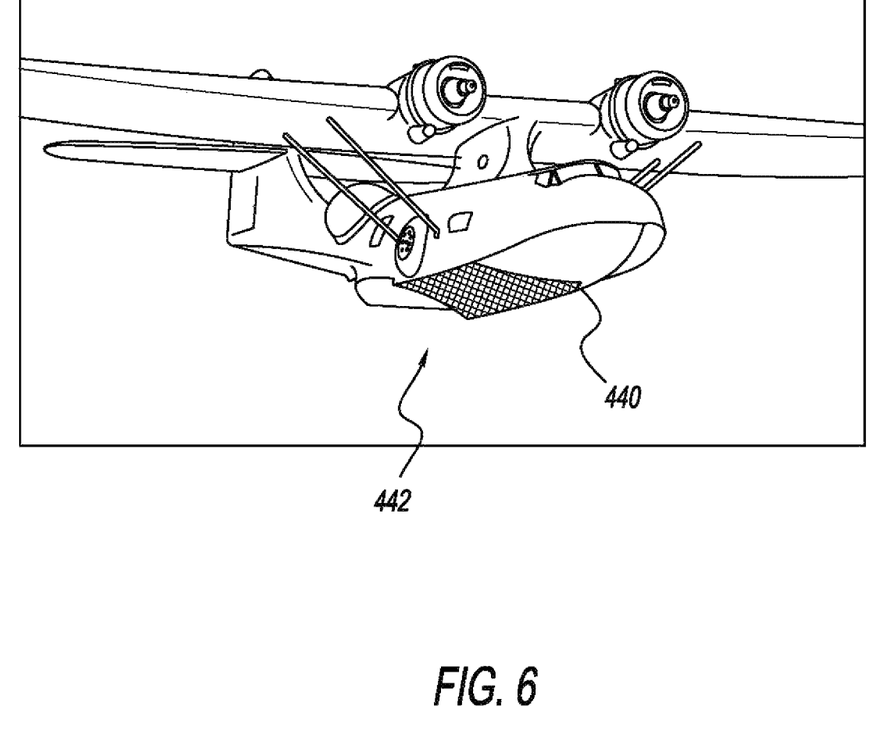
FIG. 6 is depicts a plurality of turbulators on the float body of a flying boat.

FIG. 6 depicts a flying boat including a plurality of turbulators 442 disposed on the water-engaging float hull 440. As would be understood, the float of a flying boat is integrated into the fuselage of the flying boat and defines a hull to serve as a water engaging surface. The particular plane shown in FIG. 6 is a consolidated Catalina PBY of the type flown by the Navy during the Second World War. Examples of current flying boats include the Dorneir Seastar, the Bombardier CL-415GR, the Canadair CL215, the Progressive Aerodyne Searey LX, the Akoya Amphibious Airplane, and the Seawind 300C. However, the present application is not to be construed as being limited to particular aircraft makes/models, and it is contemplated that the turbulators 204 of the present application can be integrated into a variety of seaplanes, amphibious aircraft, and any aircraft capable of takeoff from water.

Figures 7, 7C:
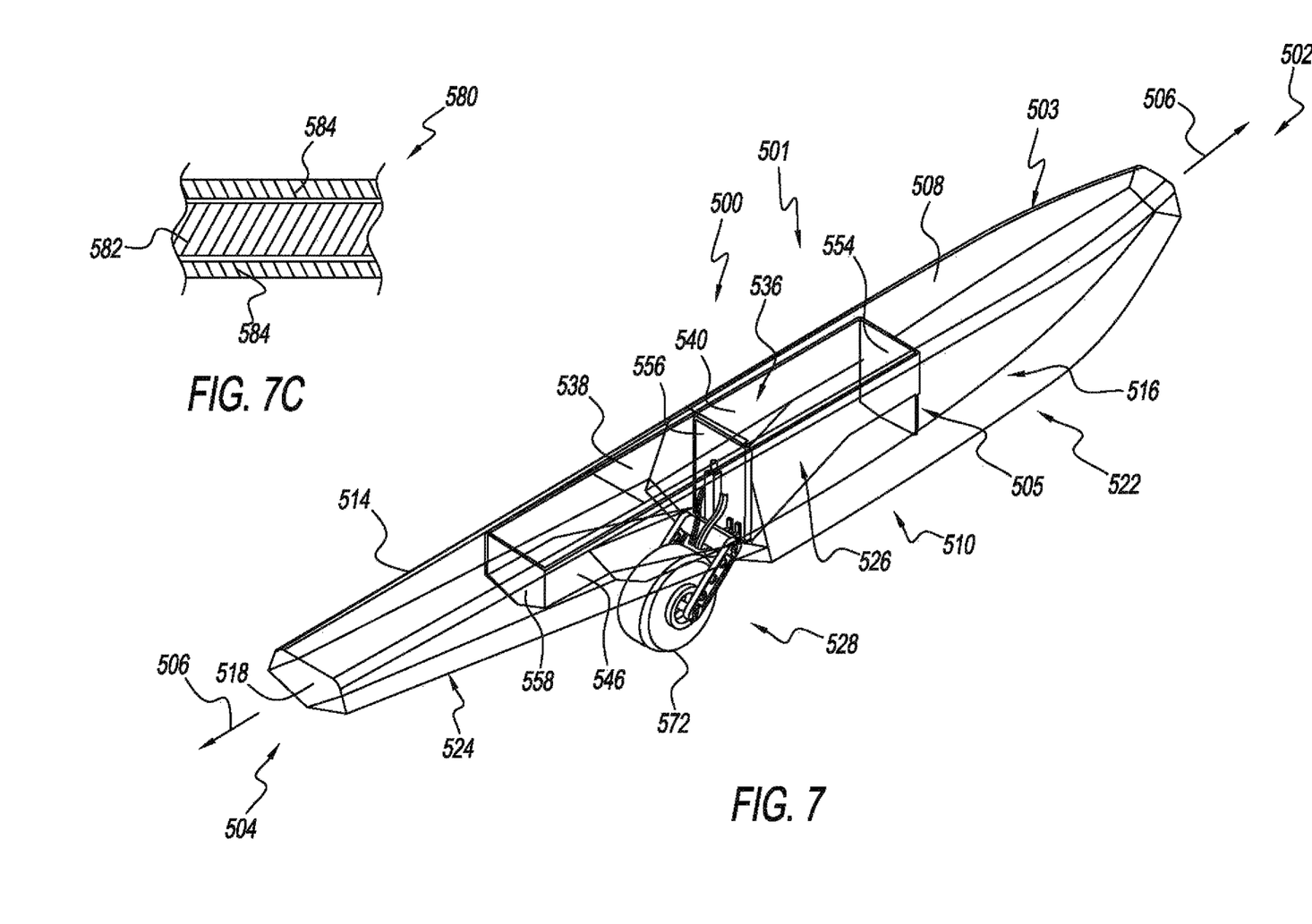
FIG. 7 is a cut-away perspective view of an airplane float having a longitudinal support structure according to one form of the present application.
FIG. 7C is an enlarged sectional view of a segment of one of the longitudinal members; 534, 542 depicting its foam core and composite skin.
Figure 8:
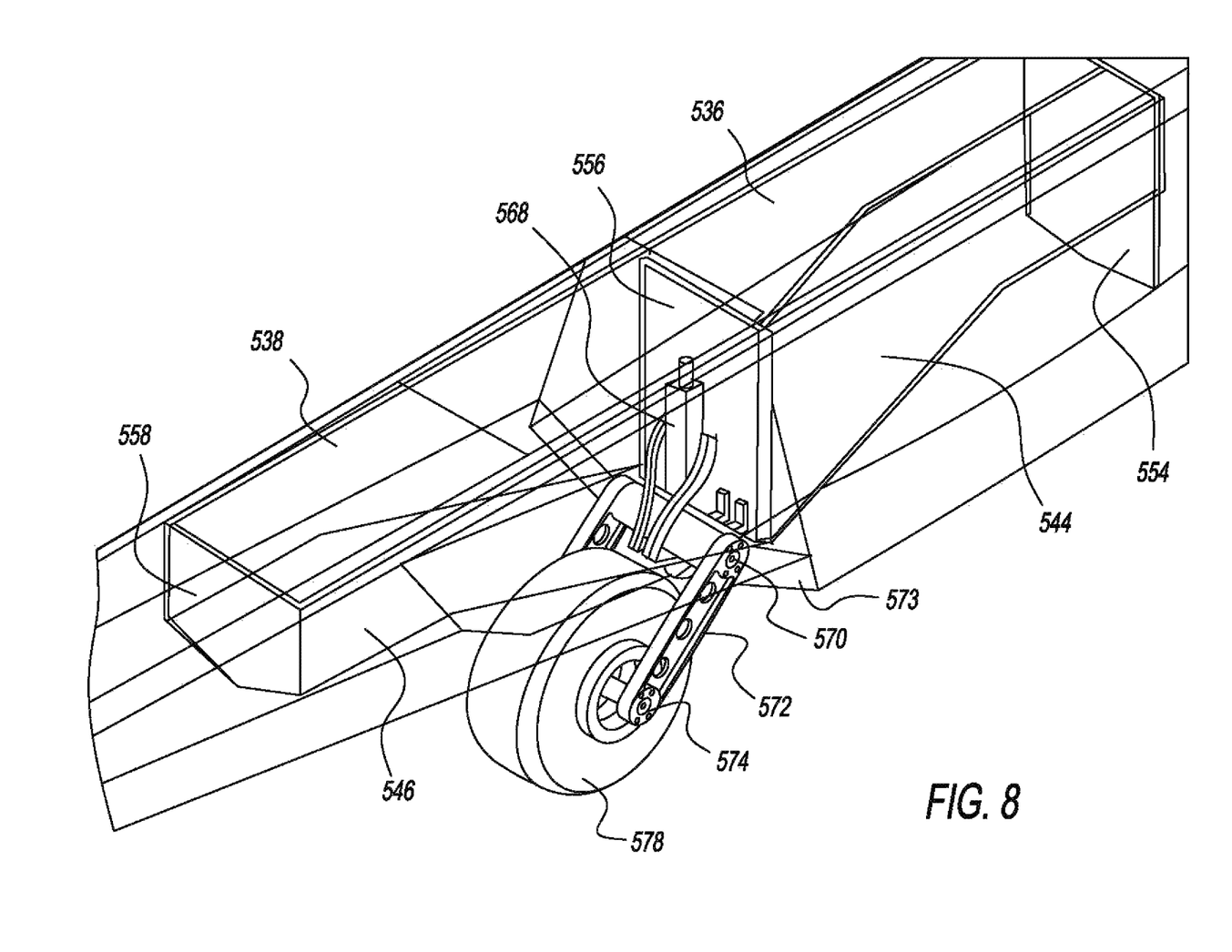
FIG. 8 is a cutaway perspective view of the longitudinal support structure of the present application with a removable landing gear.
Figure 9:
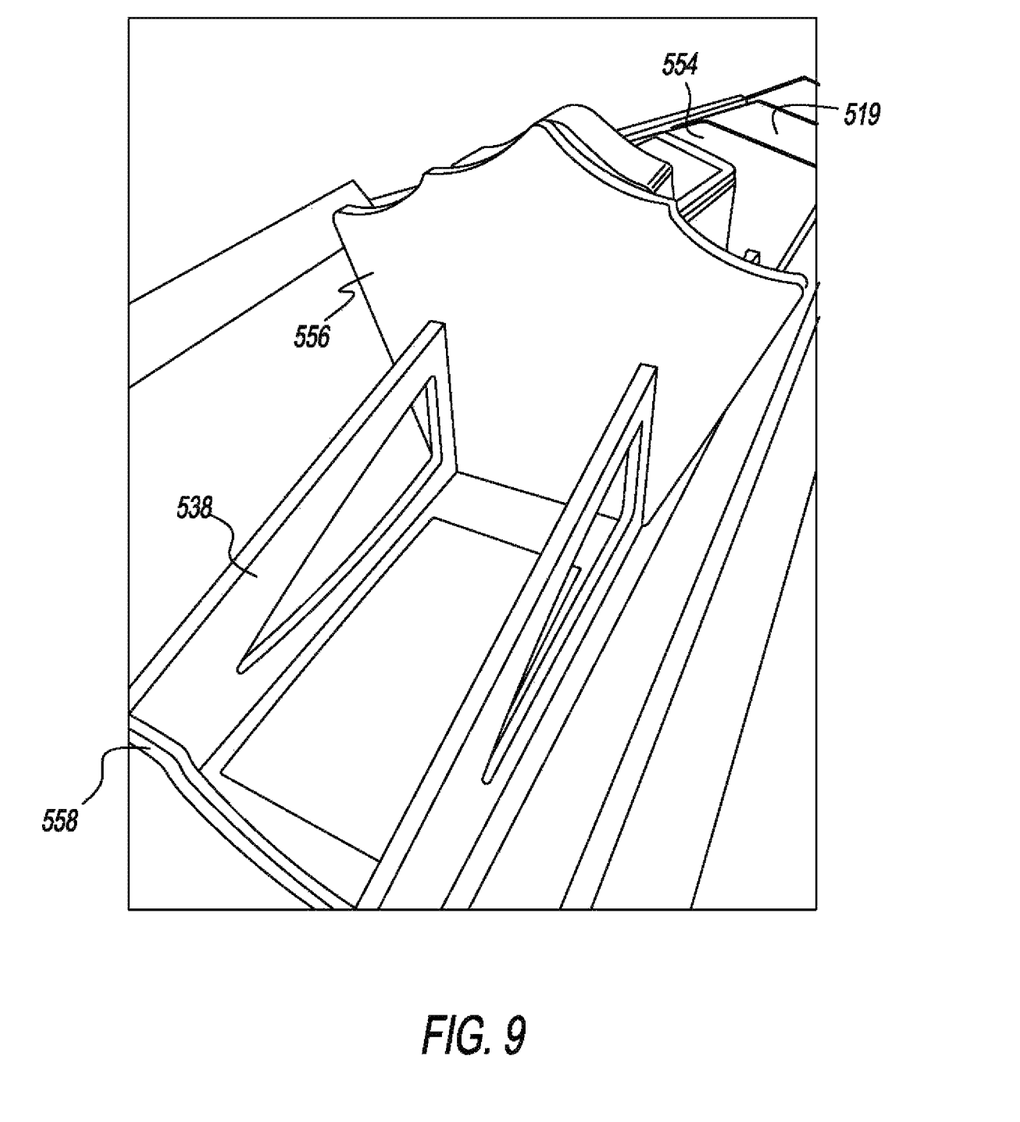
FIG. 9 is a perspective, underside view of the longitudinal support structure of the present application as inserted into an interior cavity of a float body.

FIGS. 7-9 depict one form of a float 500 including a longitudinal extending support structure 526 according to the present application. The float 500 is depicted as extending along a longitudinal axis 506 between a bow 502 and a stern 504. As was previously discussed with regard to the float 200, the float 500 provides buoyancy to an aircraft and permits the aircraft to takeoff and land on a body of water.

The float 500 includes a float body 501. An outer surface or skin 503 of the float body 501 comprises a waterproof structure. The float 500 can include an upper or dorsal surface 508, a lower water-engaging or ventral surface 510, a medial surface 514, and a lateral surface or portion 516. These surface portions 508, 510, 514, and 516 can be defined by the float skin 503. The float 500 shown in FIG. 7 is a starboard or right side float. As such, the medial surface 514 is a port side surface and the lateral surface 516 is a starboard side surface. The float 500 includes a hollow interior cavity 505. This interior cavity 505 is enclosed by the skin 503.

A left float (not shown) is the mirror image of the right side float 500 shown in the figures, In the left float (not shown), the medial surface would be the starboard side surface, and the lateral or outwardly-facing surface would be the port side surface.

The lower water engaging surface 510 of the float 500 includes a generally forwardly disposed planing portion 522, and a rearward portion 524. As with the float described in FIG. 1, the planing portion 522 is generally deeper and can have a greater depth, or height, than the rearward portion 524.

The aircraft float 500 includes a longitudinally extending support structure 526. An aircraft is coupled to the longitudinally extending support structure 526 (e.g. via pylons or other undercarriage structure as shown at 103 in FIG. 1). The longitudinally extending support structure 526 receives the force load from the aircraft. In some forms, a landing gear 528 couples to the longitudinally extending support structure 526.

The longitudinally extending support structure 516 transfers the force load from the landing gear 528 to the aircraft. The longitudinally extending support structure 526 prevents this force load from being transferred through the skin 503, thereby permitting a significant reduction in the thickness of the skin 503, as the skin will not serve as a loadbearing component.

As would be understood, any decrease in float 500 weight can advantageously permit an increase in "useful load" capacity. The longitudinally extending support structure 526 is coupled with the skin 503 to receive the force from the skin 503 and transfer this force to the aircraft, when the float 500 is floating on the water. This longitudinally extending support structure 516 is depicted as being located within the interior cavity 505 of the float 500.

A landing gear 528 can be coupled to the longitudinally extending support structure 526 to enable the aircraft to be "amphibious" and thereby capable of landing both on water and dry land. In addition to the longitudinally extending support structure 526 the float 500 may include one or more bulkhead members 519 which are spaced and extend laterally across a width of the float 500, as is shown in shown in FIG. 9. The bulkhead members 519 provide structural rigidity to the float member and serve to create a set of watertight compartments within the float 500. As such, even if one watertight compartment is pierced and fills with water, the remaining watertight compartments will prevent the float 500 from sinking.

The longitudinally extending support structure 526 includes a plurality of members which can be integrally formed of a composite material resulting in a unitary structure. As shown in FIG. 7C, the bulkhead system can be formed of the sandwich type lamination having a foam core 582 that is covered with a composite skin 584. In further forms, two foam cores 582 can be separated by an additional layer of composite (not shown).

An example of a composite skin material that will work well with the present invention is a melt-spun polyolefin multifilament yarn, such as Innegra brand yarn produced by Innegra Techologies, LLC. The Innegra yarn is woven by a number of third-party weavers, and is used in products such as hockey sticks, tennis rackets, kayaks, paddle boards, surf boards, and Formula One cars. It is also used in sail cloth and as a boat hull material.

Figure 7A:
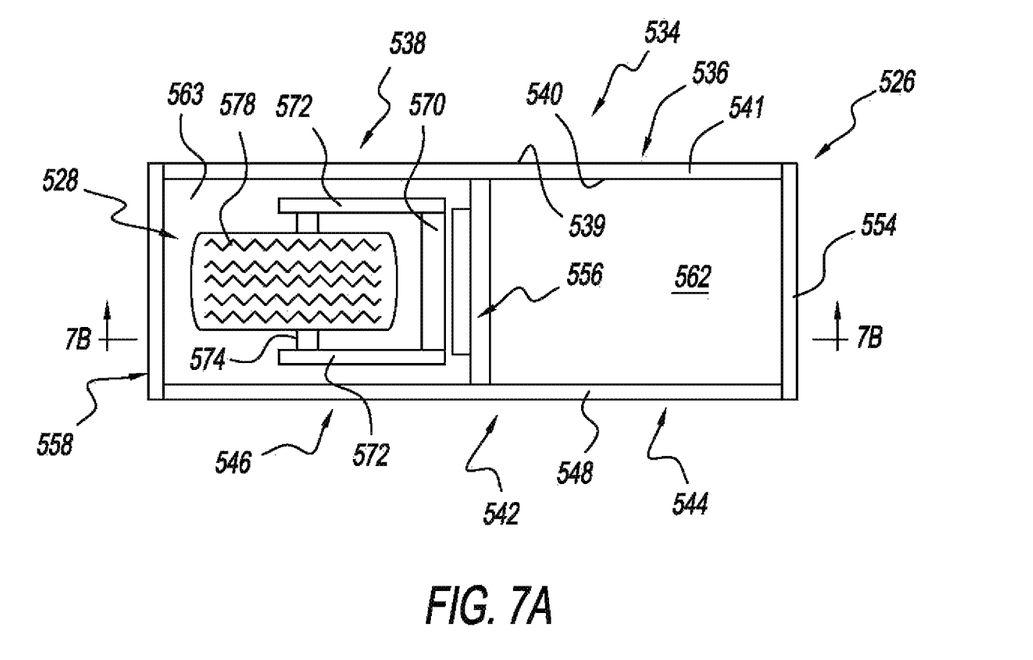
FIG. 7A is a top view of the longitudinal support structure of the present application.

The longitudinally extending support structure 526 includes a first longitudinal member 534 having a frontal portion 536 and rearward portion 538. The first longitudinal member 534 includes an exterior surface 539 that faces outwardly toward the skin 503, and an interior surface 540 that faces interiorly, along with a top edge surface 541 that is disposed under the top, or dorsal member 508 of the float. The first longitudinal member 534 also includes a bottom edge surface 543.

The longitudinal support structure frame 526 also includes a second longitudinal member 542 that is disposed in a plane generally parallel to the plane in which the first longitudinal member 534 is disposed. The second longitudinal member 542 also includes a frontal portion 544 and a rearward portion 546, a top surface 548 and a bottom edge surface 550. The bottom edge surfaces 543, 550 each include an angled portion and a generally horizontally-disposed portion. Although they are shown in the drawings as being a solid member, they may include openings for weight saving purposes. The longitudinally extending support structure 526 is depicted as being enclosed by the skin 503. In some forms, the longitudinal members 542 and 534 are only attached to the skin 503 at the upper portion 508 of the float 500. As will be discussed hereinafter, the bulkhead members 554, 556, and 558 can additionally be attached to the skin 503 and are integrally connected to the longitudinal members 542, and 534. In further forms, the longitudinal members 542 and 534 can be attached with opposing internal walls of the float 500.

The longitudinally extending support structure 526 also includes three laterally-extending members, including a first, or front, laterally-extending member 554, a second, or medially-disposed, laterally, extending member 556, and a third, or rearwardly-disposed, laterally-extending member 558. Each of the lateral members 554, 556, and 558 is configured to extend across a between the longitudinal members 534, 542. The lateral members 554, 556, 558 preferably do not attach with the skin 503.

The longitudinal members 534, 542, and the lateral bulkhead members 554, 556, 558 are all coupled together into a unitary load-bearing longitudinally extending structural member 526. A first watertight compartment 562 is defined between the front and middle lateral members 554, 556. A second watertight compartment 536 is defined between the rearward portions 538, 546 of the longitudinal members, and the middle 556 and rearward 558 lateral members. The landing gear 528 can be disposed into the second watertight compartment 536. Additional watertight compartments are depicted as being located forward of the bulkhead member 554 and rearward of the bulkhead member 558. In further forms, the longitudinal members 534, 542 can be lengthened such that the float 500 can include additional bulkhead members extending between, and coupled to, the longitudinal members 534, 542 to form additional watertight compartments if desired for a specific application.

The longitudinally extending support structure 526 is located within the interior cavity of the float 500, and the first, second, and third lateral members 554, 556, 558 are coupled to the longitudinal members 534, 542. The lateral members 554, 556, 558 are attached to the float walls 514, 516 in a manner sufficient to define the aforementioned watertight compartments.

The longitudinally extending support structure 526 of the present invention has a plurality of advantages. The strength inherent to the longitudinally extending support structure 526 provides a sturdy mounting point for the attachment of pylons, such as pylons 103 discussed with regard to FIG. 1, that transfer the weight of the aircraft to the float 500. Additionally, the composite structure of the longitudinally extending support structure 526 results in high strength while still providing some flex, thus resulting in a cushioning effect during landing or water impact. Moreover, the integration of the longitudinally extending support structure 526 permits a thinner skin 503 as the skin 503 of the float 500 is not subject forces of the same magnitude as the prior art, especially with regard to landing gear 528. This thinner skin 503 provides additional flex and cushioning.

This additional cushioning and flex can reduce the harshness of the landing, as a cushioning absorbs some of the shock to prevent the shock from being transferred to the aircraft and passengers, which not only provides a smooth landing, but also reduces the likelihood of damage occurring to the float.

Figure 7B:
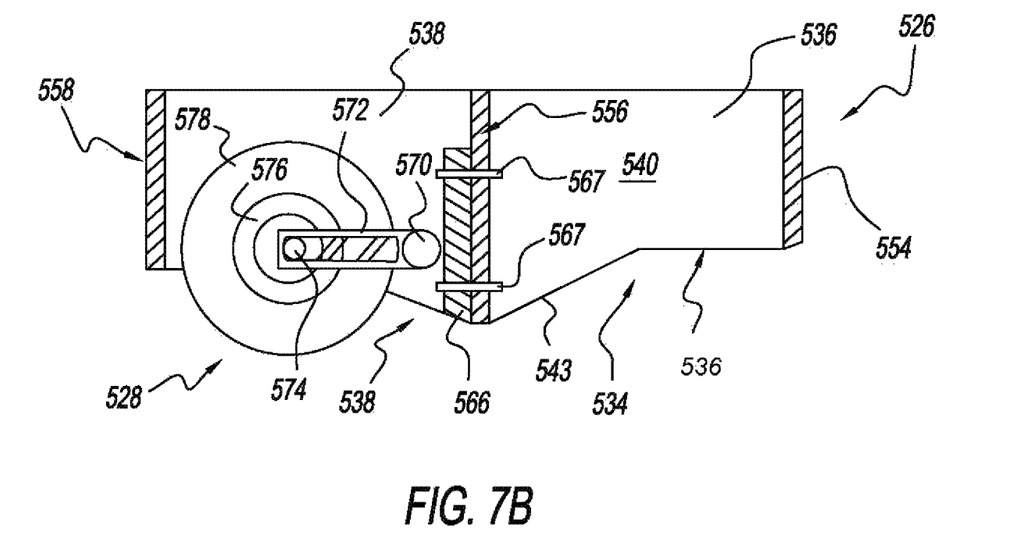
FIG. 7B is a sectional view taken along lines 7B-7B of FIG. 7A.

Further, the longitudinally extending support structure 526 provides a convenient mounting point for the landing gear 528. The landing gear 528 is mounted to the laterally extending member 556, through a plurality of bolts 567. As shown in FIGS. 7A and 7B a coupling mechanism 566 can be coupled to the dividing wall 556, with the bolts 567 extending between the coupler, and the coupler 566 and the laterally extending member 556. The coupler 566 can comprise a plate-type connection. The coupler 566 can include a track/cup system that is removably retained to the lateral wall 556.

The landing gear itself 528 can be removably interconnected to the aircraft via a quick connect system. For example, in the case of a hydraulically operated landing gear, a hydraulic line can extend from the landing gear 528 to a hydraulic pump that is mounted in the body of the plane. The hydraulic line can be coupled to the landing gear through a quick disconnect coupling, to thereby permit the landing gear 528 to be removed and reattached without loss of hydraulic fluid.

In a similar manner, an electronically operated landing gear having an electric motor to actuate it, can employ an electric quick disconnect to provide power to the landing gear 528. When the landing gear is activated, the wheel extends through an opening 573 in the float.

The float 500 can include a removable top access panel through which the landing gear system can be installed or removed onto the float 500. In this manner, the landing gear system 528 can be installed into and removed from the aircraft float 500 when the float is in the water. When the landing gear system 528 is removed from the aircraft float 500, a plug can be inserted to fill opening 573. The plug (not shown) can be retained against dividing wall 512 in a manner similar to the landing gear. Insertion of the plug restores the profile of the lower portion of the float 500 and helps to increase its buoyancy. A lid can also be utilized to cover up the top access to prevent the ingress of water therein.

The removable nature of the landing gear 628 permits the user to only incur the weight penalty of the landing gear when they know that the flight path a landing on a dry surface.

As shown in the drawings, the landing gear 520 includes a pivot member 570 that enables the pilot to pivot the wheel 576 and tire 578 from a raised to a lowered position, and a pivot frame 572 that couples the axis 574 of wheel 576 to the pivot member 570. The tire 578 is affixed onto the wheel 576. As shown in FIG. 1, the float 500 can also include a front wheel 106, a rearward wheel 108, and a rudder 114 to help the pilot control the direction of the plane when in the water. When deployed, the wheel 576 extends through an opening in the lower portion 510 of the float.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Further, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
   a float body configured to provide buoyancy to an aircraft, wherein the float body includes a water contact member configured to contact the water during aircraft takeoff; and
   a plurality of turbulators located at an outer surface of the water contact member, wherein the plurality of turbulators comprise a scale-like pattern, and wherein the plurality of turbulators are configured to generate turbulence to reduce a suction effect of the water on the float body during aircraft takeoff.

2. The apparatus of claim 1, wherein the plurality of turbulators is further configured to introduce turbulent flow into a boundary layer between the water contact member and the water.

3. The apparatus of claim 1, wherein the float body at least partially defines a pontoon of a floatplane, and wherein the plurality of turbulators is located forward of a step in the pontoon.

4. The apparatus of claim 1, wherein the aircraft further comprises a flying boat, and wherein the float body at least partially defines a portion of an aircraft fuselage of the flying boat.

5. The apparatus of claim 1, wherein the plurality of turbulators are selected from the group of turbulators consisting of semi-spherical turbulators, dimpled turbulators, semi-circular turbulators, teardrop turbulators, oblong turbulators, and chevron turbulators.

6. The apparatus of claim 5, wherein the plurality of turbulators is integrally formed into the water contact member.

7. The apparatus of claim 5, wherein water contact member is formed of a composite construction, wherein the plurality of turbulators is formed of a composite material, and wherein the plurality of turbulators is adhered to the water contact member.

8. An aircraft float, comprising:
   a float body configured to provide buoyancy to an aircraft, wherein a lower portion of the float body is configured to contact water; and
   a plurality of turbulators located at an outer surface of the float body, wherein the plurality of turbulators comprise a scale-like pattern, and wherein the plurality of turbulators are configured to generate turbulence to reduce a suction effect of water on the float body during aircraft takeoff.

9. The aircraft float of claim 8, wherein the float body further comprises a pontoon of a floatplane.

10. The aircraft float of claim 8, wherein the float body further comprises a portion of an aircraft fuselage of a flying boat.

11. The aircraft float of claim 8, wherein the turbulators are formed into the float body.

12. The aircraft float of claim 8, wherein the turbulators are coupled with the float body through at least one of adhesion and mechanical fastening.

13. The aircraft float of claim 8, wherein the turbulators are selected from the group of turbulators consisting of dimpled turbulators, semi-spherical turbulators, semi-circular turbulators, teardrop turbulators, oblong turbulators, and chevron turbulators.

14. An aircraft float, comprising:
   a float body configured to provide buoyancy to an aircraft, wherein a lower portion of the float body includes a step; and
   a plurality of turbulators located forward of the step at an outer surface of the float body,
   wherein the plurality of turbulators comprise a scale-like pattern,
   and wherein the plurality of turbulators are configured to reduce a suction effect on the float body during aircraft takeoff from water.

15. The aircraft float of claim 14, wherein the float body comprises one of a pontoon of a floatplane and a portion of an aircraft fuselage of a flying boat.

16. The aircraft float of claim 14, wherein the turbulators are adhered to the float body.

* * * * *